(12) United States Patent
Schnieders

(10) Patent No.: US 11,343,718 B2
(45) Date of Patent: May 24, 2022

(54) REAL TIME ADAPTION OF A LATENCY CRITICAL APPLICATION IN A WIRELESS NETWORK

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/429,644

(22) PCT Filed: Feb. 13, 2020

(86) PCT No.: PCT/EP2020/053712
§ 371 (c)(1),
(2) Date: Aug. 10, 2021

(87) PCT Pub. No.: WO2020/165316
PCT Pub. Date: Aug. 20, 2020

(65) Prior Publication Data
US 2022/0046481 A1 Feb. 10, 2022

(30) Foreign Application Priority Data
Feb. 13, 2019 (EP) .................................... 19156914

(51) Int. Cl.
*H04W 28/24* (2009.01)
*H04W 72/12* (2009.01)

(52) U.S. Cl.
CPC ....... *H04W 28/24* (2013.01); *H04W 72/1226* (2013.01); *H04W 72/1257* (2013.01)

(58) Field of Classification Search
CPC ............ H04W 28/24; H04W 72/1226; H04W 72/1257; H04W 28/00–26; H04W 72/00–14
See application file for complete search history.

(56) References Cited

U.S. PATENT DOCUMENTS

2016/0212758 A1* 7/2016 Leung .................. G06Q 10/063
2019/0090229 A1* 3/2019 Iwai .................. H04W 72/1231

FOREIGN PATENT DOCUMENTS

JP 2017017655 A 1/2017
WO WO 2017169061 A1 10/2017

* cited by examiner

*Primary Examiner* — Ronald Eisner
(74) *Attorney, Agent, or Firm* — Leydig, Voit & Mayer, Ltd.

(57) ABSTRACT

A method includes: a) provisioning at least one latency critical application; b) determining mean latency and mean throughput which are required by a respective latency critical application, and assigning the determined mean latency and mean throughput to a reference point value; c) allocating the reference point value to the respective latency critical application; d) calculating via a time variable point value function an actual point value for the respective latency critical application; e) comparing the reference point value with the actual point value; f) determining a difference value between the reference point value and the actual point value; g) repeating steps d) to f) for a subset of points in time within the time interval; h) summing up all difference values determined in step f) for all points in time of the subset; and i) continuously optimizing current use of resources in the cell.

10 Claims, 2 Drawing Sheets

REAL TIME ADAPTION OF A LATENCY CRITICAL APPLICATION IN A WIRELESS NETWORK

CROSS-REFERENCE TO PRIOR APPLICATIONS

This application is a U.S. National Phase application under 35 U.S.C. § 371 of International Application No. PCT/EP2020/053712, filed on Feb. 13, 2020, and claims benefit to European Patent Application No. EP 19156914.4, filed on Feb. 13, 2019. The International Application was published in English on Aug. 20, 2020 as WO 2020/165316 A1 under PCT Article 21(2).

FIELD

The disclosure relates to computer networks, particularly to wireless networks, particularly to mobile networks and, more specifically, to latency critical applications provided within those networks.

BACKGROUND

A network services exchange provider may employ a communication facility, such as a data center, in which multiple customers of the provider locate network, server, and storage gear and interconnect to a variety of telecommunications and other network service provider(s). Data centers may be shared by the multiple tenants having their networking equipment located within the data centers.

With Information Technology (IT) and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

However, there are some scenarios being realized by server based latency critical applications which require data processing near a respective end user.

Autonomous vehicles, for example, will generate a lot of data. Much of this data will be unstructured and will need to be run through powerful analytics programs to produce actionable data with any value to businesses. Edge computing architectures will help to prioritize what data needs to remain on the edge to be processed by the vehicle's onboard computing power or by any computing device nearby the vehicle and what data should be relayed back to data centers for analysis. Edge data centers will serve a critical role in this network, functioning as a relay station and providing extra computing power for mission critical analytics that need to remain near end users.

In an autonomous vehicle, even a few milliseconds of delay can result in an accident and catastrophic loss of life. The stakes are simply too high to allow the vehicles' networks to be plagued by lag. Self-driving cars need to react immediately to changing road conditions; they can't simply come to a stop while waiting for instructions or recommendations from a distant cloud server analyzing data.

Edge computing can offer a solution to this problem. In fact, the heavy investment in autonomous vehicle research has been one of the reasons so many tech companies are pushing to improve and expand their edge computing architectures. By co-locating servers and computing resources in versatile edge facilities located in both high traffic areas and more far-flung areas with limited bandwidth access, companies can ensure that their autonomous vehicles are able to access the data they need with minimal latency to make decisions quickly. As Internet of Things (IoT) devices, self-driving cars also have the ability to make their own decisions without relying on guidance from servers located in distant data centers.

A further example scenario is given by computer games which experience lag when connecting to a central server and latency could mean the difference between victory and defeat.

Edge computing is not a new concept, but several trends have come together to create an opportunity to turn massive amounts of machine-based data into actionable intelligence closer to the source of the data. Typical edge computing devices typically reside away from a centralize computing available in a cloud.

Edge computing enables analytics and data gathering to occur at or nearby the source of the data. The role of edge computing to date has mostly been used to ingest, store, filter, and send data to cloud systems. Meanwhile, it is also desirable, that edge computing systems are packing more compute, storage, and analytic power to consume and act on the data nearby the end user location.

There are some scenarios where it is useful to bring server based applications closer to terminals, i.e. user equipment (UE) and, thus, to acquire a reduced latency with respect to roundtrip-time (RTT). Specifically, MNOs (Mobile Network Operators) undertake efforts to integrate edge computing in their networks.

However, it is still quite difficult or even impossible to provide latency critical applications via a wireless interface, i.e. a radio interface of a base station of a wireless network as currently used schedulers associated with such a base station operate according to a best effort and fair schedule approach when allocating the available resources on the wireless interface which leads to an inacceptable variance in latency and jitter for any latency critical application.

SUMMARY

In an exemplary embodiment, the present invention provides a method. The method includes: a) provisioning at least one latency critical application which is to be provided to at least one end user device in a cell via a base station serving the cell; b) determining for each latency critical application of the at least one latency critical application mean latency and mean throughput which are required by the respective latency critical application, and assigning the determined mean latency $L_{AV}$ and mean throughput $D_{AV}$ to a reference point value, wherein the reference point value is calculated via a reference point value function $PW_R(L, D)$, wherein the reference point value function $PW_R(L, D)$ assigns the tuple $(L_{AV}, D_{AV})$ consisting of mean latency $L_{AV}$ and mean throughput $D_{AV}$ to the reference point value $PW_R(L_{AV}, D_{AV})$, and wherein the reference point value represents an allocation of resource utilization of the respective latency critical application; c) allocating the reference point value to the respective latency critical application; d) calculating via a time variable point value function $PW(L, D, T)$ an actual point value $PW$ for the respective latency critical application based on latency and throughput currently required by the respective latency critical application at a point in time $T\_N-u$ within a time interval $[T\_N-u, T\_N]$, wherein the point value function $PW(L, D, T)$ assigns at a point in time $T$ each tuple $(L, D)$ consisting of latency L and throughput D to a distinct point value PW(L, D), and wherein each point value represents an actual allocation of resource utilization of the respective latency critical application; e) comparing the reference point value with the actual point value; f) determining a difference value between the reference point value and the actual point value; g) repeating steps d) to f) for a subset of points in time T_v within the time interval [T_N−u,T_N], wherein N, u, v are positive integer values, and u≤N and N−u≤v≤N; h) summing up all difference values determined in step f) for all points in time T_v of the subset to form a sum SDP; and i) continuously optimizing current use of resources in the cell by considering the sum SDP of step h) for adapting the respective latency critical application in real time to current transmission conditions in a network.

BRIEF DESCRIPTION OF DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
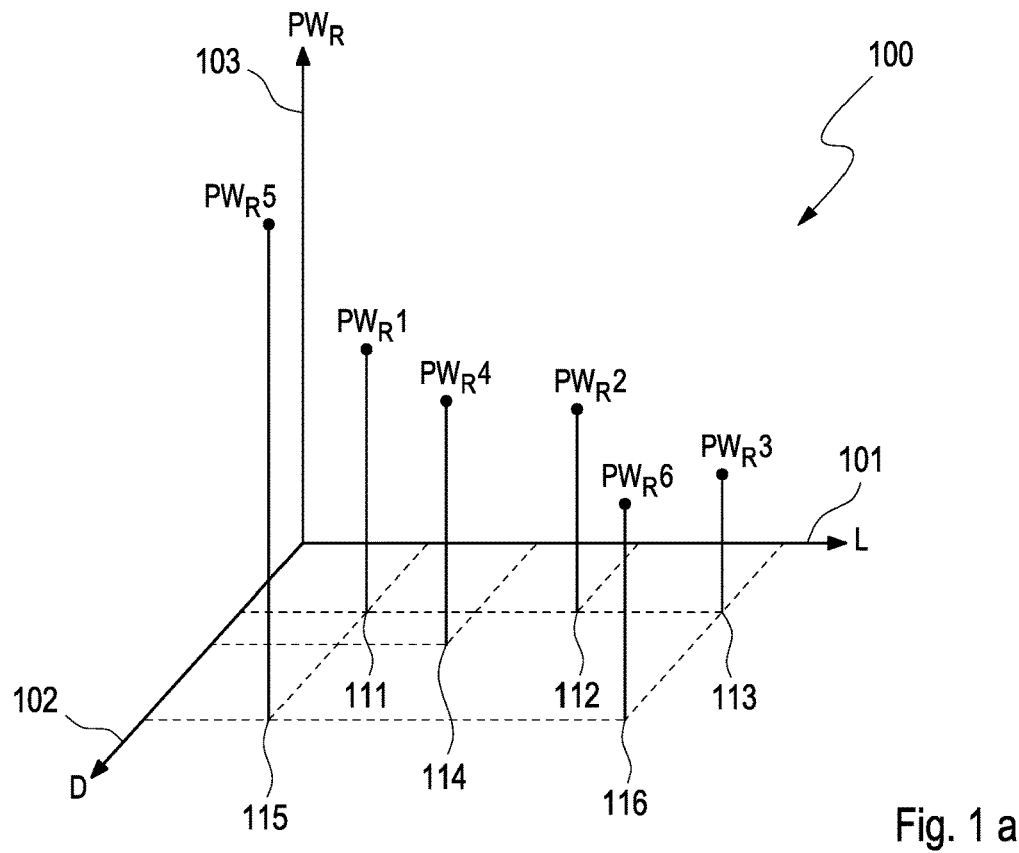
FIGS. 1a-1c are schematic diagrams illustrating an example point value function as it can be used according to one embodiment of the present disclosure.
Figure 1:
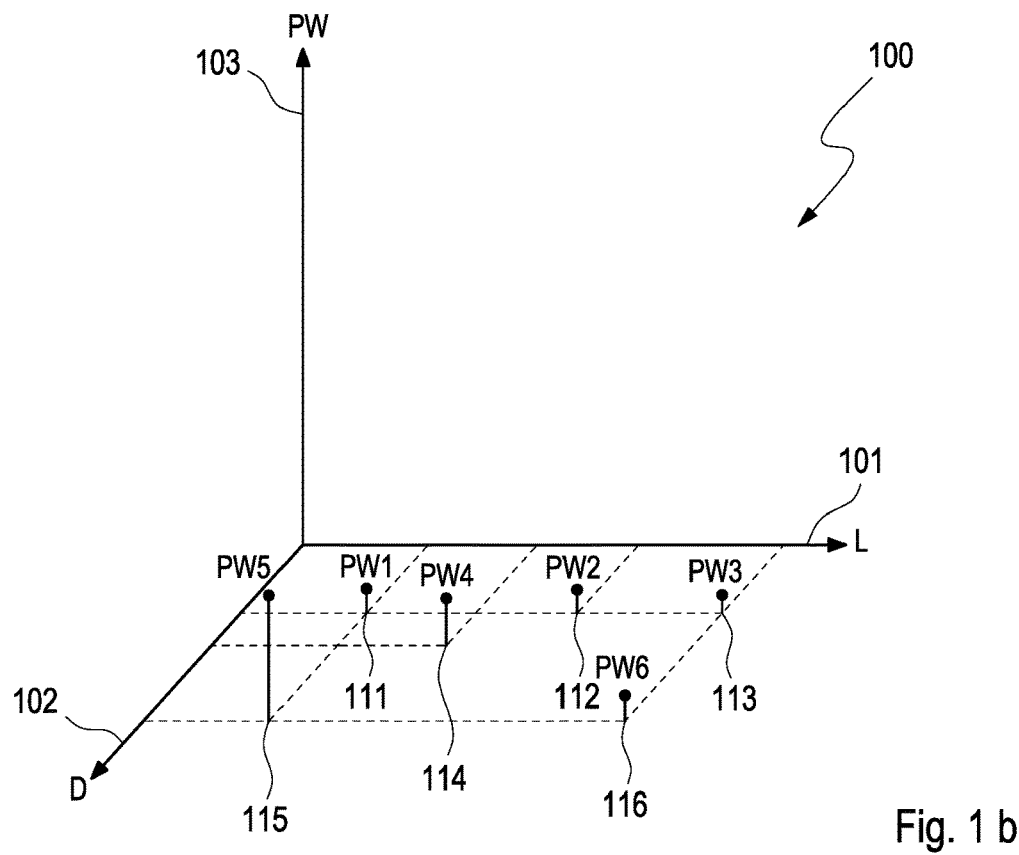

A parallel application titled "Real time adaption of a latency critical application" provides a possibility to identify an acceptable operating point for the latency critical application and to optimize simultaneously the spectrum utilization on the radio interface, i.e. in a respective cell served by a respective base station, accordingly. However, there is still the possibility that the latency critical application tends to always select the operating point which seems to be the best from the application's point of view and, therefore, to block respective resources. This may impede an arbitration between the applications connected to the base station via a scheduler associated with the base station.

Exemplary embodiments of the present disclosure facilitate such arbitration.

Generally, up to now schedulers strive to optimize data throughput for all devices which are connected to the base stations housing the respective schedulers in order to acquire a high spectrum efficiency (Bit/s/Hz), such as algorithm proportional fair, thus, exhausting the limited and valuable resources at the best. However, generally, no differentiation is made between different types of use cases, such as YouTube videos which are buffered and latency critical applications. Both the YouTube videos and the latency critical applications have same priority.

As a result, the latency for an application can extremely vary in dependence on the number of connected users (i.e. user equipment), the signal quality, etc. Such variance can be recognized via different mean latencies subject to location and time, and also via a respective jitter.

Nowadays, latency critical applications, such as driver assistance systems with the exchange of surroundings models, remote rendering and streaming of AR (artificial reality) and VR (virtual reality) applications, VR360 applications, offloading of computer vision algorithms for drones, vehicles, robots, etc. underlie the normal scheduling. The occurring variance with respect to the mean latency and the jitter impede or even hinder the use of latency critical applications via the radio. Further, a static allocation of resources would reduce the spectrum efficiency and, thus, increase the costs for such latency critical applications.

According to the parallel application entitled "real time adaption of a latency critical application", a scheduler associated with a base station allocates the available resources to a latency critical application which is to be provided via the base station in accordance with the current requirements of the latency critical application, the current requirements of the latency critical application being determined and communicated by the latency critical application itself.

Further, the latency critical application which is hosted by an edge computing system located nearby the base station, determines in real time on the basis of a present operations status of the latency critical application at least some of the following context data: separated for uplink and downlink: a currently required latency, a maximum required latency, a currently required minimum throughput, maximum error rate, priority, desired duration or number of desired transmissions of this configuration. These determined context data are then sent by the at least one latency critical application in real time via an API endpoint of the edge computing system and SLRA (service layer radio application) which is implemented on both the base station and the edge computing system, to the scheduler associated with the base station.

It is further described that the scheduler associated with the base station dynamically takes into account the determined context data received from the latency critical application hosted by the edge computing system when allocating and reserving the available resources for the latency critical application.

In order to guarantee latencies or maximum latencies, resources have to be prioritized or blocked. In the case of a radio network those resources are resource blocks or resource elements. The latency critical application hosted by the edge computing system provides the base station, i.e. the scheduler in real time with context sensitive parameters about the latency critical application, such as a current mean latency, the application needs at a present point in time, a maximum latency, a data rate the application needs at the present point in time and further parameters which are useful for the scheduler as reference point for the current state of the latency critical application. These parameters are provided besides other conventional parameters such as channel condition, historical throughput, packet delay, queue length, etc.

In order to prevent that the latency critical application always asks for its best possible operating point although other operating points would also be currently acceptable, the present disclosure provides the following:

A method is provided, the method comprising:
  a) provisioning, preferably at at least one selected edge computing system of a plurality of edge computing systems each located nearby a respective base station of a wireless network and deployed and managed by a network provider and/or at at least one end user device, at least one latency critical application which is to be provided to the at least one end user device (i.e. user equipment) in a cell via the base station serving the cell,
  b) determining for each of the at least one latency critical application mean latency and mean throughput which are required by the respective one of the at least one latency critical application, and assigning the determined mean latency $L_{AV}$ and mean throughput $D_{AV}$ to a reference point value, the reference point value being calculated via a reference point value function $PW_R(L, D)$, the reference point value function $PW_R(L, D)$ assigning the tuple $(L_{AV}, D_{AV})$ consisting of mean latency $L_{AV}$ and mean throughput $D_{AV}$ to the reference point value $PW_R(L_{AV}, D_{AV})$, the reference point value represents an allocation/intensity of resource utilization of a respective application, c) allocating the calculated reference point value $PW_R(L_{AV}, D_{AV})$ to the respective latency critical application, d) calculating via a time variable point value function PW (L, D, T) an actual point value PW for the respective latency critical application based on latency and throughput currently required by the respective latency critical application at a point in time T_N−u within a time interval [T_N−u,T_N], the point value function PW(L, D, T) assigning at a point in time T each tuple (L, D) consisting of latency L and throughput D to a distinct point value PW(L, D, T), each point value represents an actual allocation/intensity of resource utilization of the respective application, e) comparing the allocated reference point value with the actual point value, f) determining a difference value between the reference point value and the actual point value, g) repeating steps d) to f) for a subset of points in time T_v within the time interval [T_N−u,T_N], with N, u, v being positive integer values, respectively, and u≤N and N−u≤v≤N, h) summing up all difference values determined in step f) for all points in time T_v of the subset, thus, forming a sum SDP, i) continuously optimizing current use of the resources in the cell by considering the sum SDP of step h) for adapting the respective latency critical application in real time to current transmission conditions, particularly on the cell and/or at the end user device.

Regarding the indices of the point in times, the following applies: the higher the value, the later the respective point in time.

Continuously optimizing means that real time changes concerning data transmission are observed and an adaption to those changes takes place whenever those changes have impact on data transmission quality.

The at least one application is specified here as a latency critical application. However, exemplary embodiments of the present disclosure can also be applied to near or no latency critical applications.

Transmission is to be understood within the scope of the present disclosure in a broad sense, particularly as data transmission, i.e. as a transfer of data (a digital bitstream or a digitized analog signal) over a communication channel, such channels can be copper wires, optical fibers, wireless communication channels, storage media and computer buses. In the present disclosure, particularly wireless communication channels are considered.

Data can be represented as electromagnetic signals, such as radio waves, microwaves, an electrical voltage or infrared signal. Data can be represented as packets, frames, bits, information considering all different communication layers.

Proximity is defined by a physical proximity (distance) and a logical proximity (hops) between the selected edge computing system and the base station. The reduced latency enables a new class of applications whose complex computing mechanisms can still be run on an external server (the edge computing system) and must not be run on the user equipment, i.e. the end user device, while, nevertheless, real time critical or near real time critical functions of the respective application can be realized.

The decisive end-to-end latency is defined not only by the location of the edge computing system with respect to the user equipment, i.e. the end user device, but also by the latencies within the radio path.

According to one embodiment, step i) comprises:
j) providing each of the at least one latency critical application in real time at a point in time T_N+w with the time variable point value function PW(L, D, T_N+w) and the respective application specific sum SDP which has been calculated in step h) for the time interval [T_N−u,T_N] with T_N being before T_N+w, with w being a positive integer value, k) calculating for each possible operating point of the respective one of the at least one application a respective point value at the point in time T_N+w via the point value function PW(L, D, T_N+w);

l) prioritizing the operating points regarding the respective calculated point values and the SDP;

m) allocating the resources to the respective one of the at least one application according to the current prioritization;

n) repeating steps j) to m) iteratively and continuously by increasing each time the run parameter N by 1 with u, v, w being variable positive integer values.

Generally, each of the at least one latency critical applications defines for its own operation different possible operating points with accordingly different quality stages.

Each of the at least one latency critical application determines as a function of its current status different possible operating points, each representing an allowable solution for the at least one latency critical application. However, the different operating points are assigned different quality stages for the at least one latency critical application, for example via a "graceful degradation".

The different operating points are defined by at least some of the following requirement parameters:
1. mean latency
2. maximum latency
3. data rate/throughput
4. maximum error rate
5. desired length of the operating point (in milliseconds)
6. desired number of transmissions
7. priority
8. further possible parameters which describe the operation status of the application The possible operating points for the at least one application are defined beforehand by a developer. The aim of such determination of operating points is to perform a substitution of uncontrollable errors and states due to changed latency and throughput by a controlled reduced user experience. If an optimal operating point for the at least one latency critical application due to a full cell or other specific cell conditions is not realizable, the controlled adaption of a further allowed operating point is possible.

Each of the possible operating points of the at least one latency critical application is assigned a priority and defined by at least one of the following parameters: minimum throughput downlink, minimum throughput uplink, maximum latency downlink, maximum latency uplink, maximum error rate, desired duration or number of desired transmissions of this configuration. Due to the assignment of respective point values to the different operating points wherein the assignment is dynamically reviewed dependent on the dynamically newly determined point value function (which may change in dependence of current cell conditions), the operating points are not only prioritized in view of their respective quality but also in view of their respective point values. Such point values can be acquired beforehand from the network provider. A respective user and/or supplier of a latency critical application can prioritize the operating points of the latency critical application with regard to quality and point value by applying, for example, an appropriate cost function.

The decision process about the operating points which are to be taken up in specific scenarios can be subdivided into three stages:

(1) the developer of the at least one latency critical application defines all possible operating points for the at least one latency critical application when developing the at least one latency critical application, (2) the at least one latency critical application decides itself which operating points are eligible in a specific scenario, i.e. in a specific current status of the at least one latency critical application. Thus, for each scenario there is a group of operating points from which one operating point can be selected. Further, the at least one latency critical application dynamically prioritizes the operating points within the group by taking into account the dynamically determined respective point values for each operating point via the point value function which is dynamically provided by the scheduler in consideration of the conditions on/in the cell, (3) the scheduler finally decides in real time and dynamically, which operating point of the group of operating points is selected dependent on the current status of the cell.

It is possible that the possible operating points for the at least one latency critical application are listed together with the previously determined prioritization of the possible operating points in a table of operating points and are sent in real time from the respective one of the at least one latency critical application hosted by the selected edge computing system to the scheduler of the base station, the scheduler of the base station aggregates all possible operating points of all applications which are currently running via the base station, allocates the available resources accordingly and sends a feedback message to the respective one of the at least one latency critical application hosted by the selected edge computing system about the finally selected operating point for the respective one of the at least one latency critical application.

The following table gives an example how operating points can be defined for the at least one latency critical application:

| Operating Point No. | Through put Downlink (Kbit/s) | Max. Latency Downlink (ms) | Through put Uplink (Kbit/s) | Max. Latency Uplink (ms) | Priority | Description: |
|---|---|---|---|---|---|---|
| 1. | 10.000 | 10 | 5 | 10 | 1 | Optimal operating point for the application => Optimal User Experience |
| 2. | 7.000 | 10 | 5 | 10 | 2 | increased compression rate for streaming => QoS / user experience decrease due to compression artifacts |
| 3. | 10.000 | 20 | 5 | 10 | 3 | Increasing prediction for AR application (via extrapolation of the movement), in order to compensate higher latency => acceptance of more prediction errors |
| 4. | 5.000 | 30 | 5 | 20 | 4 | Further increasing of compression rate and prediction (Extrapolation, Interpolation) => acceptance of more prediction errors, QoS/ user experience decrease due to still more compression artifacts |
| 5. | ... | ... | ... | ... | 6 | ... |
| 6. | ... | ... | ... | ... | 7 | ... |
| 7. | 1000 | 100 | 5 | 100 | 8 | Application at this location and this time no more usable => => informing the user in a controlled manner with suggestion of issues (change of location, etc.) |

The possible operating points are transferred together with their respective requirement parameters via the SLRA in real time to the scheduler. On the basis of current point values the priorities of the operating points can dynamically be altered.

The scheduler aggregates all requirements of all latency critical applications. Then, the scheduler determines the allocation of resources for all user equipment within the cell. Thereby, the scheduler takes into account:
  a. The no latency critical applications within the cell,
  b. The latency critical application within the cell, c. Conventional input parameters such as channel condition, historical throughput, packet delay, queue length for each user equipment,
d. Requirement parameters originating from the defined operating points of the latency critical applications.

First, an allocation of resources to all connected devices (i.e. to latency critical and no latency critical applications which are to be provided to those connected devices) with requirement parameters indicated with priority 1 of the operating points are examined for realization. Only in the case that a resource shortfall occurs, the alternatives of the further priorities of the operating points are considered until a successful resource allocation is found. Thereby, it is possible to put all latency critical applications equally in their next lower priority stage. Further, any kind of mixed method is possible. An optimization between no latency critical and latency critical applications is possible. When a successful resource allocation is identified the scheduler applies this resource allocation and provides a respective application in real time with a report about the finally selected operating point.

It is also possible that the scheduler associated with the base station and the at least one latency critical application hosted by the selected edge computing system exchange iteratively information for negotiating a best adjustment of the at least one application to present data transmission conditions.

There are two possible alternatives for starting such iterative process.

According to a first alternative, the scheduler associated with the base station sends, as starting point of the negotiation, an initial configuration comprising at least a maximum latency and a data rate to the at least one latency critical application hosted by the selected edge computing system. It is possible that the scheduler sends further parameters. Such initial configuration is to be understood as a suggestion on the basis of which further negotiation is to be pursued.

According to a second alternative, the at least one latency critical application hosted by the selected edge computing system sends, as starting point of the negotiation, an initial configuration comprising at least one operating point or a list of possible operating points with respective priorities for the at least one application as starting point of the negotiation to the scheduler associated with the base station. Such initial configuration is to be understood as a suggestion on the basis of which further negotiation is to be pursued.

When receiving the initial configuration the respective party, i.e. the scheduler associated with the base station or the at least one latency critical application hosted by the selected edge computing system, examines the initial configuration and accepts the initial configuration or transmits a proposal for changes to the respective other party, i.e. to the at least one latency critical application hosted by the selected edge computing system or to the base station, particularly to the scheduler associated with the base station. Particularly, the scheduler is often forced to perform iterations as the scheduler which has to control and administrate a plurality of latency critical applications, has to determine the correct operation status, i.e. all of the plurality of latency critical applications have to be supported, i.e. supplied with resources at the best. As the allocation of resources has to consider all latency critical applications simultaneously, usually more cycles between scheduler and the at least one latency critical application provisioned by the selected edge computing system are necessary. This scenario requires a higher reliability of the real time connection (realized by the SLRA) between the scheduler and the at least one latency critical application hosted by the selected edge computing system because more than one communication processes can follow each other. This has an influence on the time the scheduler needs to determine an optimal allocation of the resources.

It is possible that real time events occur which lead to changes in the cell. Such changes can cause changing operation conditions for the at least one latency critical application. In case of such changes in the cell the scheduler associated with the base station covering the cell sends in real time an information about such changes and/or such changing operation conditions via SLRA to the at least one latency critical application hosted by the selected edge computing system. Furthermore, the scheduler determines in real time, i.e. at a point in time T the point value function PW (L, D, T) and transfers the newly determined point value function PW (L, D, T) to the at least one latency critical application. The point value function PW (L, D, T) is time variable and changes dynamically dependent on a current status within the cell and/or at the user equipment (the end user device). The at least one latency critical application decides about a new subset of operating points which can be adopted by the latency critical application in order to adapt to the changing operation conditions in the cell at best. The at least one latency critical application calculates for each possible operating point via the newly received point value function PW (L, D, T) a respective new point value. In view of the respective new point values for all operating points, respectively, the at least one latency critical application weighs for each operating point a point value assigned to a respective operating point against a quality assigned to the same operating point and prioritizes the operating points in the list of operating points accordingly. Such weighing up can be realized via an appropriate cost function. The at least one latency critical application sends the scheduler a message via SLRA about the new subset of operating points, i.e. the newly prioritized operating points in view of the newly calculated point values for each operating point, and the scheduler selects one operating point of the new subset of operating points (considering the new prioritization of the operating points). The scheduler always aims to select the operating point with the highest priority as far as possible in view of a current status on the cell.

Such exchange of transmission specific data between the scheduler and the at least one latency critical application happens in real time with each discernable change in the cell and/or at the user equipment and/or at the at least one latency critical application.

In an exemplary embodiment, when prioritizing the operating points of the respective one of the at least one latency critical application, not only the criteria of minimum throughput downlink, minimum throughput uplink, maximum latency downlink, maximum latency uplink, maximum error rate, desired duration or number of desired transmissions of this configuration are considered, but also the calculated point values for the different operating points at a considered point in time T and the calculated SDP. In view of the newly considered parameters SDP and point values, it is avoided that a respective latency critical application only envisage to choose the operating point which is objectively and solely considered the best for said respective latency critical application.

According to a further embodiment, the point value function PW (L, D, T_N+w) which is valid at the current point in time T_N+w is determined in real time by the scheduler of the base station and transferred from the scheduler to each of the at least one latency critical application, each of which being hosted by a respective one of the at least one selected edge computing system located nearby the base station.

The wording "scheduler associated with the base station" is to be understood as a scheduler which can be co-located with the base station or which can be part of the base station or which can be located remotely from the base station for which it operates.

According to still a further embodiment, each one of the at least one latency critical application calculates in step k) for each of its possible operating points a respective point value at the point in time T_N+w via the point value function PW (L, D, T_N+w) and prioritizes in step l) its operating points and informs the scheduler about its current prioritization of its operating points.

The point value function PW (L, D, T) is dynamically determined for a point in time T dependent on the respective conditions on the cell at said point in time T. It is possible that the point value function is periodically determined with a specific well-defined periodic time ΔT. Alternatively, the point value function is only newly determined when it is stated, particularly by a control unit hosted by the base station, that the operation conditions on the cell have (discernibly) changed, i.e. when it is stated at a point in time T that the number of end user devices within the cell, i.e. the end user devices (wirelessly) connected to the base station, has increased or decreased, etc. That means that the control unit continuously observes what happens within the cell and immediately states when the operation conditions within the cell change. In case of changing operation conditions observed at a point in time T, the control unit immediately, i.e. in real time initiates at that point in time T that the point value function PW (L, D, T) is newly determined. The scheduler or a computing unit can determine the new point value function. There is a pre-given rule/algorithm on the basis of which the time variable point value function can be generated.

The respective conditions in the cell which are analyzed and observed at said point in time T are selected from the group comprising at least: number of end user devices located within the cell and channel conditions.

Generally, the point value increases with decreasing latency and/or with increasing throughput, and the point value decreases with increasing latency and/or decreasing throughput.

Generally, the base station and the at least one selected edge computing system hosting the at least one latency critical application are logically connected via a service layer radio application (SLRA) which is implemented on both the base station and the at least one selected edge computing system and, thus the at least one latency application hosted by the at least one selected edge computing system communicates with the scheduler associated with the base station via SLRA.

The selected edge computing system can be realized as cloudlet. Due to the proximity of the selected edge computing system to the scheduler, information can be transmitted between the at least one latency critical application hosted by the selected edge system and the scheduler in real time. Thereby, the at least one latency critical application at the selected edge computing system is logically connected with the radio scheduler associated with the base station via the service layer radio application (SLRA). This enables the scheduler to send and/or receive context sensitive information/parameters about the cell and/or from the at least one latency critical application via this service layer.

Due to the reviewed prioritization of the operating points in view of the calculated point values, only resources are blocked at a specific point in time for the at least one latency critical application which are really required by the at least one latency critical application at this specific point in time for a still satisfactory operation. Thereby, an optimized usage of the spectrum of the radio frequencies is reached while the actual requirements of the at least one latency critical application are fulfilled.

Thus, for example, a vehicle driving with a low velocity (or in stillstand) can transmit periodically data such as a surroundings model with a higher maximum latency without compromising the driving safety. Conversely, the maximum latency should be reduced when the vehicle is driving with a higher velocity in order to adapt the reaction times within the global system accordingly and to guarantee the driving security.

Particularly, applications with a high data throughput are relevant for the adaptation of the data rate, such as video based applications: a remote rendering of an AR application requires the streaming of video data. Thereby, the data rate can be reduced or has to be increased as a function of the number of rendered objects, the size of the image area, the required resolution for the depth of detail, etc.

The present disclosure refers to a possibility to efficiently use the actual room for operation each application has, without risking to operate unconfidently.

Due to the provision of the context sensitive parameters/requirements and the list of the dynamically prioritized operating points of the at least one latency critical application in real time with respect to maximum latency and data rate, the scheduler can dynamically optimize the distribution and allocation of the radio resources.

Thus, by the knowledge of the current effective requirements of the at least one latency critical application with regard to maximum latency and data rate (throughput) and the current prioritization of the operating points of the at least one latency critical application, the scheduler gets more flexible when allocating and reserving the limited resources of the radio spectrum. Thus, the spectrum can be used/exploited more efficiently as by algorithms without knowledge of a current status of the at least one latency critical application. Such conventional algorithms consider latency requirements only statically and with a lowest latency or with a mean latency which leads to the above-mentioned disadvantages such as unsatisfactory and insufficient exploitation of the radio spectrum.

According to a further embodiment, the scheduler associated with the base station determines in real time at a point in time T available resources for the at least one latency critical application as a function of a current status of the cell served by the base station, taking into account all connected devices with their applications, latency critical and/or non-latency critical applications, and their requirements and the overall available resources in the cell, derives therefrom a currently attainable individual data throughput and/or a currently attainable individual latency and/or a current individual packet loss for the at least one latency critical application, and a new point value function PW (L, D, T) and sends the currently attainable individual data throughput and/or the currently attainable individual latency and/or the current individual packet loss and the new point value function to the at least one latency critical application via the SLRA and the at least one latency critical application adapts in real time accordingly.

The application adapts to the present status of the base station by prioritizing dynamically its possible operating points on the basis of PW (L, D, T) and transferring such new list of operating points to the scheduler so that the scheduler has, due to the new prioritization, generally more room to distribute/allocate the available resources on the cell.

Instead of an indirect tuning of the application the provided method enables the at least one latency critical application to adapt in real time to a current status of a radio cell which is served by the base station. The at least one latency critical application is running near the base station within the selected edge computing system. Thus, the scheduler within the base station can transmit in real time status information about the radio cell to the at least one latency critical application hosted by the selected edge computing system. Such status information is transmitted via the service layer radio application (SLRA) which logically connects the base station/the scheduler with the selected edge computing system and, thereby, with the at least one latency critical application. The scheduler determines in real time the resources which are available for the at least one latency critical application in terms of resource blocks or resource elements. Therefrom, the possible latency and the data rate on the radio for the at least one latency critical application are derivable. Further parameter, such as packet loss, etc. can be determined. The status data "new latency", "new data rate", "packet loss", etc. are transmitted together with an updated point value function PW via SLRA in real time to the selected edge computing system and transferred to the at least one latency critical application. The at least one latency critical application can adapt now to the new status information and can capture a new appropriate operations status by taking into account respective point values calculated via the dynamically determined point value function for all possible operating points for the at least one latency critical application.

Thus, an autonomous vehicle can reduce its velocity when the latency guaranteed by the base station, i.e. the scheduler is currently increased. Conversely, the vehicle can increase its velocity as soon as the latency is reduced.

With remote rendering a higher compression rate with more image/compression artifacts can be used in order to adapt to a new data rate.

With computer games with a central game server, mechanisms such as interpolation and extrapolation can be reactivated with higher latencies with which higher latencies can be equalized, but which can also lead to errors.

Due to the ideal co-working of scheduler, selected edge computing system and the at least one latency critical application in real time a satisfactory operations status of the at least one latency critical application and the fair allocation of resources within the cell can be realized at any time.

The present disclosure further refers to a system comprising:
at least one edge computing system which is located nearby a respective base station of a wireless network and deployed and managed by a network provider, wherein the at least one edge computing system provisions/hosts at least one latency critical application which is to be provided to at least one end user device in a cell via a base station serving the cell and located nearby the at least one edge computing system, and/or
at least one end user device which is located in the cell and which provisions/hosts the at least one latency critical application,
a scheduler associated with the base station serving the cell,
the at least one latency critical application, wherein the at least one edge computing system and/or the at least one end user device are configured, respectively, to communicate with the scheduler associated with the base station which serves the cell,
wherein a reference point value is assigned to the at least one latency critical application, the reference point value being calculated via a reference point value function $PW_R(L, D)$, the reference point value function $PW_R(L, D)$ assigning a tuple ($L_{AV}$, $D_{AV}$) consisting of mean latency $L_{AV}$ and mean throughput $D_{AV}$ of the at least one latency critical application to the reference point value $PW_R(L_{AV}, D_{AV})$, the reference point value represents an allocation/intensity of resource utilization of the at least one latency critical application,
wherein at least one of the scheduler, the at least one latency critical application, the at least one end user device and the at least one edge computing system are configured to:
1. calculate via a time variable point value function PW(L, D, T) an actual point value PW for the at least one latency critical application based on latency and throughput currently required by the at least one latency critical application at a point in time T_N–u within a time interval [T_N–u,T_N], the point value function PW(L, D, T) assigning at a point in time T each tuple (L, D) consisting of latency L and throughput D to a distinct point value PW, each point value represents an actual allocation/intensity of resource utilization of the respective application,
2. compare the reference point value with the actual point value,
3. determine a difference value between the reference point value and the actual point value,
4. repeat steps 1) to 3) for a subset of points in time T_v within the time interval [T_N–u,T_N], with N, u, v being positive integer values, respectively, and u≤N and N–u≤v≤N,
5. sum up all difference values determined in step 3) for all points in time T_v of the subset, thus forming a sum SDP,
6. provide the respective one of the at least one latency critical application with the sum SDP, wherein the at least one latency critical application is configured to continuously adapt in real time to current transmission conditions, particularly on the cell and/or at the end user device, by considering the sum SDP.

The system is specifically configured to execute a method with at least some of the features described before.

The present disclosure further provides a non-transitory computer readable storage medium comprising instructions that when executed cause one or more processors of a wireless network to execute a method with at least some of the features described before.

The computer readable storage medium particularly comprises instructions that when executed cause one or more processors of a wireless network to:
A) provision, preferably at at least one selected edge computing system of a plurality of edge computing systems each located nearby a respective base station of a wireless network and deployed and managed by a network provider, at least one latency critical application which is to be provided to at least one end user device in a cell via the base station serving the cell (and located nearby the at least one selected edge computing system),
B) determine for each of the at least one latency critical application mean latency and mean throughput which are required by the respective one of the at least one latency critical application, and assign the determined mean latency $L_{AV}$ and mean throughput $D_{AV}$ to a reference point value, the reference point value being calculated via a reference point value function $PW_R(L, D)$, the reference point value function $PW_R(L, D)$ assigning the tuple $(L_{AV}, D_{AV})$ consisting of mean latency $L_{AV}$ and mean throughput $D_{AV}$ to the reference point value $PW_R(L_{AV}, D_{AV})$, the reference point value represents an allocation/intensity of resource utilization of a respective application, C) allocate the calculated reference point value to the respective latency critical application, D) calculate via a time variable point value function PW(L, D, T) an actual point value PW for the respective latency critical application based on latency and throughput currently required by the respective latency critical application at a point in time T_N−u within a time interval [T_N−u, T_N], the point value function PW(L, D, T) assigning at a point in time T each tuple (L, D) consisting of latency L and throughput D to a distinct point value PW(L, D), each point value represents an actual allocation/intensity of resource utilization of the respective application, E) compare the allocated reference point value with the actual point value, F) determine a difference value between the reference point value and the actual point value, G) repeat steps D) to F) for a subset of points in time T_v within the time interval [T_N−u, T_N], with N, u, v being positive integer values, respectively, and u≤N and N−u≤v≤N, H) sum up all difference values determined in step F) for all points in time T_v of the subset, thus forming a sum SDP, I) continuously optimizing current use of the resources in the cell by considering the sum SDP of step H) for adapting the respective latency critical application in real time to current transmission conditions, particularly on the cell and/or at the end user device.

Thus, a real time adaption of the parties concerned, such as scheduler/cell and/or application, is reached.

The details of one or more exemplary embodiments are set forth in the accompanying drawings and the description below. Other features, objects, and advantages of the exemplary embodiments will be apparent from the description and drawings, and from the claims.

FIG. 1a is a schematic diagram illustrating several reference point values of an example reference point value function $PW_R$ (L, D). FIG. 1a shows a coordinate system with three coordinate axes 101, 102 and 103. Latency L is plotted along axis 101, data rate (throughput) D is plotted along axis 102 and a reference point value $PW_R$ as a result of the reference point value function $PW_R$ (L, D) dependent on a specific latency L and a specific data rate D is plotted along axis 103. That means that the reference point values $PW_R$ are plotted over the latency L and the data throughput D. In FIG. 1a, the reference point value function $PW_R$ (L, D) is shown via several reference point values $PW_R1$, $PW_R2$, $PW_R3$, $PW_R4$, $PW_R5$, $PW_R6$ at positions 111 to 116.

Generally, the reference point value $PW_RX$, X=1, 2, 3, 4, 5, 6, increases with decreasing latency L and/or with increasing throughput D, and the reference point value $PW_RX$ decreases with increasing latency L and/or decreasing throughput D.

The lowest reference point value $PW_R3$ at 113 is assigned to a high latency L and a small data throughput D compared with the other reference point values $PW_R1$ at 111, $PW_R2$ at 112, $PW_R4$ at 114, $PW_R5$ at 115 and $PW_R6$ at 116.

The highest reference point value $PW_R5$ at 115 is assigned to a small latency L and a high throughput D compared with the other reference point values $PW_R1$ at 111, $PW_R2$ at 112, $PW_R3$ at 113, $PW_R4$ at 114 and $PW_R6$ at 116.

The specific reference point value function $PW_R$ (L, D) is defined by the network provider (MNO).

Figure 1C:
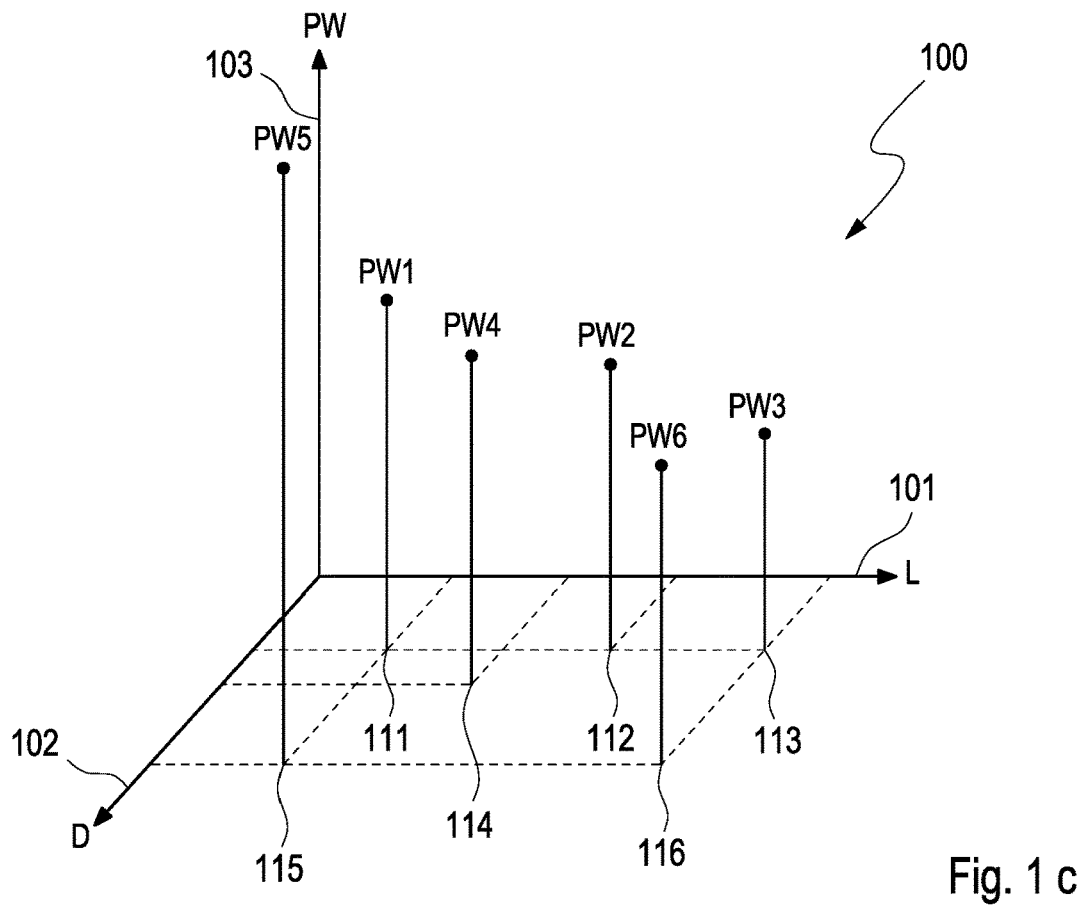

FIGS. 1b and 1c show two different use cases. FIG. 1b shows a time variable point value function PW (L, D, T) for a near empty cell. All actual point values which are calculated for the latencies and the data rates corresponding to those of FIG. 1a, respectively, i.e. at the positions 111, 112, 113, 114, 115, 116, respectively, are lower compared to the respective reference point values. This is because the reservation of resources for a small latency and a high latency is less at the expense of other users within the cell compared to a more populated cell and/or to more critical transmission conditions. FIG. 1c shows in contrast thereto the point value function PW (L, D, T) for a full cell and/or for more critical conditions for the end user device (e.g. at an edge of the cell). All actual point values are now higher compared to the respective reference point values.

A user determines a mean latency $L_{AV}$ and a mean data throughput $D_{AV}$ for his use case of a respective latency critical application via an end user device. A reference point value $PW_R$ for this user is calculated as $PW_R$ ($L_{AV}$, $D_{AV}$) via the reference point value function $PW_R$ (L, D).

When actually using the latency critical application via the end user device, the time variable point value function PW (L, D, T) is to be applied which considers current conditions of the end user device and/or in a respective cell which currently serves the end user device.

Thus, the point value function PW (L, D, T) can change dependent on a current situation/current conditions within the cell. The point value function PW(L, D, T) assigns, at a point in time T, each tuple (L, D) consisting of latency L and throughput D to a distinct point value PW(L, D) wherein each point value represents an allocation/intensity of resource utilization of a respective application which requires the respective latency L and the respective throughput D. Thus, the point value function PW (L, D, T) reflects dynamically the allocation/intensity of resource utilization of a respective application.

For each latency critical application, the respective application producer and/or the respective user of the application can purchase a previously fixed reference point value $PW_R$. Such reference point value $PW_R$ is based on a mean latency and a mean throughput assumed as being required on average by the respective application.

In case that an actually determined point value PW for a latency critical application at a point in time T lies above or below the reference point value $PW_R$, the difference is captured by the network provider. The network provider forms a sum SDP by summing up all difference points within a specific time interval, i.e. within a period under review:

$$SDP = \sum_{i=0}^{N} \Delta PW = \sum_{i=0}^{N} [PW(L, D, T_i) - PW_R(L_{AV}, D_{AV})]$$

with $T_i$ being a discrete point in time within a period under review defined, for example, by the interval $[0, T_N]$ or $$SDP = \int_{T=0}^{T_P} (PW(L, D, T) - PW_R(L_{AV}, D_{AV}))dT$$

with [0, $T_P$] being the period under review.

The sum SDP reflects a consolidated status of the allocation/intensity of resource utilization of the respective application. At the end of the period under review the SDP can be settled towards the application producer or the user of the application. That means that a positive value of SDP indicates additional costs which have to be settled by the application producer and/or the user of the application. Thus, it is the interest of the application producer and/or the user of the application to prevent such additional costs by continuously controlling the operating points in accordance with exemplary embodiments of the present disclosure.

Figure 2:
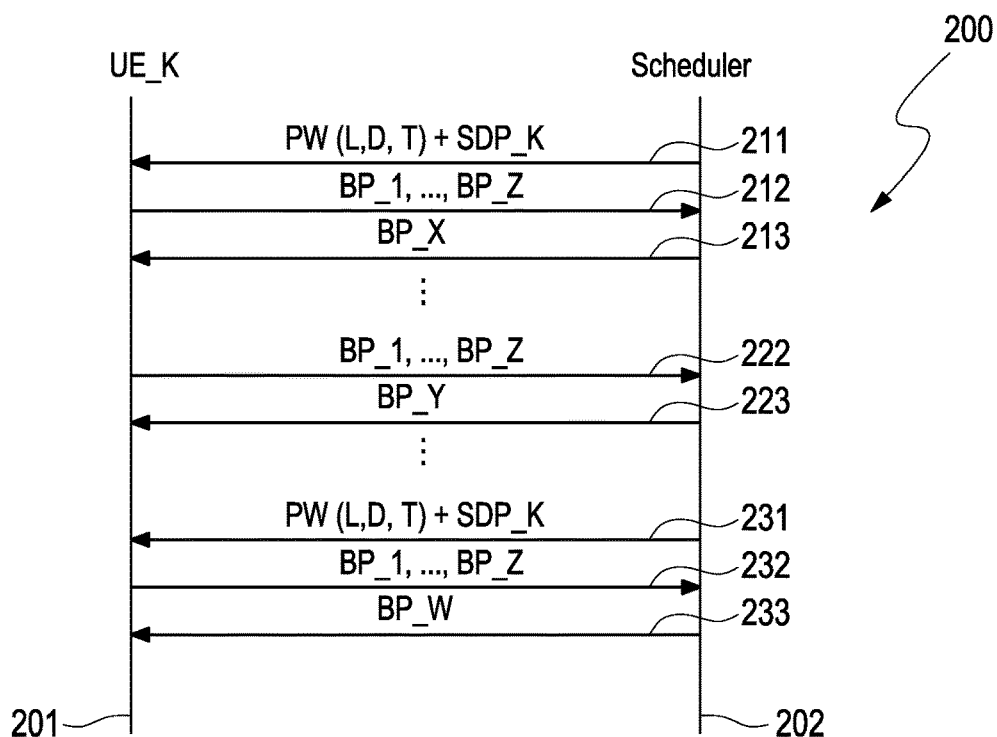
FIG. 2 illustrates schematically a data transfer between a user equipment and a scheduler in accordance with exemplary embodiments described herein.

FIG. 2 shows a flow diagram illustrating in parts an embodiment of the present disclosure. Starting point is a wireless network of a network provider and an end user device UE_K which is located within a cell of the wireless network and which is to be provided with a latency critical application via a base station which serves the cell. There are several possible operating points BP_1, . . . , BP_Z for the latency critical application, each of the possible operating points BP_1, . . . , BP_Z being defined at least by a specific latency L_1, . . . , L_Z and a specific data throughput D_1, . . . , D_Z with Z being an integer. Due to the different latencies L_1, . . . , L_Z and/or throughputs D_1, . . . , D_Z among the different operating points, the operating points are generally assigned to different quality levels accordingly. Further, the operating points are assigned at a point in time T to different point values of the previously described time variable point value function PW (L, D, T). Each point value can correspond to a specific monetary value. For each latency critical application the user and/or the application producer purchases in advance a previously fixed reference point value calculated via the reference point value function $PW_R$ (L, D). In the following several point values are calculated via the time variable point value function PW (L, D, T) for different points in time within a period under review and compared with the reference point value. As described with reference to FIGS. 1a-1c, all resulting difference points within the period under review are summed up to form a sum SDP_K for end user K, i.e. the end user device UE_K.

A scheduler 202 associated with the base station which supplies the cell of the cellular network with resources, provides in step 211 the end user device UE_K, i.e. the latency critical application which is to be supplied to the end user device UE_K, in real time at a current point in time T_N+w with the point value function PW (L, D, T_N+w) which is valid at the current point in time T_N+w. Further, the scheduler 202 transmits the application specific sum SDP_K which has been calculated before for the period under review, i.e. for a time interval [T_N−u,T_N] with T_N being before T_N+w. The latency critical application can be a client based application and hosted directly by the user equipment UE_K or it can be a server based application and hosted by a server, particularly by a selected edge computing system.

The latency critical application and/or a computing unit of a selected edge computing system hosting the latency critical application calculates for each possible operating point BP_I of the entirety of possible operating points BP_1, . . . , BP_Z of the latency critical application a respective point value at the current point in time T_N+w via the point value function PW (L, D, T_N+w). Further, the possible operating points are newly prioritized for the current point in time T_N+w by taking into account as assessment criteria not only the respective latency and the respective throughput but also the respective point value at the current point in time T_N+w and the SDP_K. A list of the possible and newly prioritized operating points is sent in step 212 to the scheduler 202 which selects in step 213 one operating point BP_X of the possible operating points and allocates the resources accordingly.

At all times, particularly in case that a change takes place on the part of the end user K it is possible to transfer in a step 222 a list of newly prioritized operating points BP_1, . . . , BP_Z to the scheduler 202. The scheduler 202 can select again in step 223 on the basis of the new list an appropriate operating point BP_Y for the latency critical application.

In case that the conditions on the cell are changing at a current point in time T_N+s, with s being a positive integer value, s>w, e.g. the number of end user devices connected to the cell changes, the scheduler 202 calculates the point value function PW (L, D, T_N+s) which is valid at the current point in time T_N+s which is after the point in time T_N+w and sends the newly calculated point value function PW (L, D, T_N+s) together with the SDP_K in step 231 to the end user device, i.e. to the latency critical application hosted by the selected edge computing system.

The latency critical application and/or the computing unit of the selected edge computing system calculates again for each possible operating point BP_I of the entirety of possible operating points BP_1, . . . , BP_Z of the latency critical application a respective point value at the current point in time T_N+s via the point value function PW (L, D, T_N+s). Further, the possible point values are newly prioritized for the current point in time T_N+s by taking into account as assessment criteria not only the respective latency and the respective throughput but also the respective point value at the current point in time T_N+s and the SDP_K. The latency critical application and/or the computing unit of the selected edge computing system determines again a list of newly prioritized operating points and transfers the new list in step 232 to the scheduler 202 which selects in step 233 an appropriate operating point BP_W.

For the sake of convenience, the point value function is designated in the FIG. 2 generally by PW(L,D,T), although the point value function can change with time as indicated before. The same applies to the sum SDP which is generally designated by SDP_K.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| List of reference signs | |
|---|---|
| 101 | |
| 102 | coordinate axes |
| 103 | |
| $PW_R1$ | |
| $PW_R2$ | |
| . | |
| . | reference point values |
| . | |
| . | |
| $PW_R6$ | |
| 111 | |
| . | |
| . | positions, tuples (L, D) |
| . | |
| 116 | |
| BP_1, BP_2, . . . , BP_Z | operating points |
| 201 | end user device |
| 202 | scheduler |
| 211 | step |
| 212 | step |
| 213 | step |
| 222 | step |
| 223 | step |
| BP_X | |
| BP_Y | selected operating point |
| BP_W | |
| 231 | step |
| 232 | step |
| 233 | step |
| SDP_K | sum |
| PW(L, D, T) | point value function |

The invention claimed is:

1. A method comprising:
 a) provisioning at least one latency critical application which is to be provided to at least one end user device in a cell via a base station serving the cell;
 b) determining for each latency critical application of the at least one latency critical application mean latency and mean throughput which are required by the respective latency critical application, and assigning the determined mean latency $L_{AV}$ and mean throughput $D_{AV}$ to a reference point value, wherein the reference point value is calculated via a reference point value function $PW_R(L, D)$, wherein the reference point value function $PW_R(L, D)$ assigns a tuple $(L_{AV}, D_{AV})$ consisting of mean latency $L_{AV}$ and mean throughput $D_{AV}$ to the reference point value $PW_R(L_{AV}, D_{AV})$, and wherein the reference point value represents an allocation of resource utilization of the respective latency critical application;
 c) allocating the reference point value to the respective latency critical application;
 d) calculating via a time variable point value function PW(L, D, T) an actual point value PW for the respective latency critical application based on latency and throughput currently required by the respective latency critical application at a point in time T_N−u within a time interval [T_N−u,T_N], wherein the point value function PW(L, D, T) assigns at a point in time T each tuple (L, D) consisting of latency L and throughput D to a distinct point value PW(L, D), and wherein each point value represents an actual allocation of resource utilization of the respective latency critical application;
 e) comparing the reference point value with the actual point value;
 f) determining a difference value between the reference point value and the actual point value;
 g) repeating steps d) to f) for a subset of points in time T_v within the time interval [T_N−u,T_N], wherein N, u, v are positive integer values, and u≤N and N−u≤v≤N;
 h) summing up all difference values determined in step f) for all points in time T_v of the subset to form a sum SDP; and
 i) continuously optimizing current use of resources in the cell by considering the sum SDP of step h) for adapting the respective latency critical application in real time to current transmission conditions in a network.

2. The method according to claim 1, wherein step i) comprises:
 j) providing each latency critical application of the at least one latency critical application in real time at a point in time T_N+w with the time variable point value function PW(L, D, T) and a respective application-specific sum SDP which has been calculated in step h) for the time interval [T_N−u, T_N] with T_N being before T_N+w, with w being a positive integer value;
 k) calculating for each possible operating point of the respective one of the at least one application a respective point value at the point in time T_N+w via the point value function PW(L, D, T_N+w);
 l) prioritizing the operating points regarding the respective calculated point values and the SDP;
 m) allocating the resources to the respective latency critical application according to the current prioritization; and
 n) repeating steps j) to m) iteratively and/or continuously by increasing each time the run parameter N by 1, wherein u, v, w are variable positive integer values.

3. The method according to claim 2, wherein the point value function PW(L, D, T) which is valid at the current point in time T_N+w is determined in real time by a scheduler of the base station and transferred from the scheduler to each latency critical application of the at least one latency critical application which are each hosted by a respective selected edge computing system of at least one selected edge computing system located nearby the base station and/or by the at least one end user device located in the cell.

4. The method according to claim 3, wherein each latency critical application of the at least one latency critical application calculates in step k) for each of its possible operating points a respective actual point value at the point in time T_N+w via the point value function PW(L, D, T) and prioritizes in step l) its operating points and informs the scheduler about its current prioritization of its operating points.

5. The method according to claim 1, wherein the time variable point value function PW(L, D, T) is dynamically determined for a point in time T dependent on conditions on the cell at the point in time T.

6. The method according to claim 5, wherein the conditions in the cell at the point in time T are selected from a group comprising at least:
number of end user devices located within the cell, channel conditions.

7. The method according to claim 1, wherein the point value of the time variable point value function increases with decreasing latency and/or with increasing throughput, and the point value decreases with increasing latency and/or decreasing throughput.

8. The method according to claim 1, wherein the base station and the at least one end user device hosting the at least one latency critical application are logically connected via a service layer radio application (SLRA) which is implemented on both the base station and the at least one end user device hosting the at least one latency critical application; and/or
wherein the base station and at least one edge computing system hosting the at least one latency critical application are logically connected via an SLRA which is implemented on both the base station and the at least one selected edge computing system, and the at least one latency critical application communicates with a scheduler associated with the base station via the SLRA implemented on both the base station and the at least one selected edge computing system.

9. A system, comprising:
at least one edge computing system comprising a processor, which is located nearby a respective base station of a wireless network and deployed and managed by a network provider, wherein the at least one edge computing system provisions at least one latency critical application stored in memory, which is to be provided to at least one end user device in a cell via a base station serving the cell and located nearby the at least one edge computing system; and/or
at least one end user device which is located in the cell and which provisions the at least one latency critical application;
wherein the system further comprises:
a scheduler associated with the base station serving the cell; and
the at least one latency critical application;
wherein the at least one edge computing system and/or the at least one end user device are configured, respectively, to communicate with the scheduler associated with the base station which serves the cell;
wherein a reference point value is assigned to the at least one latency critical application, wherein the reference point value is calculated via a reference point value function $PW_R(L, D)$, wherein the reference point value function $PW_R(L, D)$ assigns a tuple $(L_{AV}, D_{AV})$ consisting of mean latency $L_{AV}$ and mean throughput $D_{AV}$ of the at least one latency critical application to the reference point value $PW_R(L_{AV}, D_{AV})$, and wherein the reference point value represents an allocation of resource utilization of the at least one latency critical application;
wherein at least one of the scheduler, the at least one latency critical application, the at least one end user device and the at least one edge computing system is configured to:
1. calculate via a time variable point value function PW(L, D, T) an actual point value PW for the at least one latency critical application based on latency and throughput currently required by the at least one latency critical application at a point in time T_N−u within a time interval [T_N−u,T_N], wherein the point value function PW(L, D, T) assigns at a point in time T each tuple (L, D) consisting of latency L and throughput D to a distinct point value PW, and wherein each point value represents an actual allocation of resource utilization of the respective application;
2. compare the reference point value with the actual point value;
3. determine a difference value between the reference point value and the actual point value;
4. repeat steps 1) to 3) for a subset of points in time T_v within the time interval [T_N−u,T_N], wherein N, u, v are positive integer values, and u≤N and N−u≤v≤N;
5. sum up all difference values determined in step 3) for all points in time T_v of the subset to form a sum SDP; and
6. provide the at least one latency critical application with the sum SDP;
wherein the at least one latency critical application is configured to continuously adapt in real time to current transmission conditions, particularly on the cell and/or at the at least one end user device, by considering the sum SDP.

10. A non-transitory computer-readable storage medium comprising instructions that, when executed, cause one or more processors of a wireless network to:
A) provision at least one latency critical application which is to be provided to at least one end user device in a cell via a base station serving the cell;
B) determine for each latency critical application of the at least one latency critical application mean latency and mean throughput which are required by the respective latency critical application, and assign the determined mean latency $L_{AV}$ and mean throughput $D_{AV}$ to a reference point value, wherein the reference point value is calculated via a reference point value function $PW_R(L, D)$, wherein the reference point value function $PW_R(L, D)$ assigns a tuple $(L_{AV}, D_{AV})$ consisting of mean latency $L_{AV}$ and mean throughput $D_{AV}$ to the reference point value $PW_R(L_{AV}, D_{AV})$, and wherein the reference point value represents an allocation of resource utilization of the respective latency critical application;
C) allocate the reference point value to the respective latency critical application;
D) calculate via a time variable point value function PW(L, D, T) an actual point value PW for the respective latency critical application based on latency and throughput currently required by the respective latency critical application at a point in time T_N−u within a time interval [T_N−u,T_N], wherein the point value function PW(L, D, T) assigns at a point in time T each tuple (L, D) consisting of latency L and throughput D to a distinct point value PW(L, D), and wherein each point value represents an actual allocation of resource utilization of the respective latency critical application;
E) compare the reference point value with the actual point value;
F) determine a difference value between the reference point value and the actual point value;
G) repeat steps D) to F) for a subset of points in time T_v within the time interval [T_N−u,T_N], wherein N, u, v are positive integer values, and u≤N and N−u≤v≤N;
H) sum up all difference values determined in step F) for all points in time T_v of the subset to form a sum SDP; and I) continuously optimizing current use of resources in the cell by considering the sum SDP of step H) for adapting the respective latency critical application in real time to current conditions on the cell.

* * * * *